United States Patent
Saito et al.

(10) Patent No.: US 7,172,836 B2
(45) Date of Patent: Feb. 6, 2007

(54) NONAQUEOUS ELECTROLYTE BATTERY AND METHOD FOR MANUFACTURING IT, AND POSITIVE ACTIVE MATERIAL, AND METHOD FOR PRODUCING IT

(75) Inventors: Takamitsu Saito, Fukushima (JP); Yoshikatsu Yamamoto, Fukushima (JP); Shinji Hatake, Fukushima (JP)

(73) Assignee: Sony Corporation, Tokyo (JP)

( * ) Notice: Subject to any disclaimer, the term of this patent is extended or adjusted under 35 U.S.C. 154(b) by 478 days.

(21) Appl. No.: 10/296,754

(22) PCT Filed: Mar. 22, 2002

(86) PCT No.: PCT/JP02/02776

§ 371 (c)(1),
(2), (4) Date: May 9, 2003

(87) PCT Pub. No.: WO02/082574

PCT Pub. Date: Oct. 17, 2002

(65) Prior Publication Data

US 2003/0180614 A1    Sep. 25, 2003

(30) Foreign Application Priority Data

Mar. 30, 2001  (JP) ............................. 2001-100641
Mar. 30, 2001  (JP) ............................. 2001-100642

(51) Int. Cl.
   *H01M 4/50* (2006.01)
(52) U.S. Cl. ................. 429/231.95; 429/223; 429/224; 429/218.1
(58) Field of Classification Search ........... 429/231.95, 429/231.1, 223, 221, 231.6, 224, 229, 231.2, 429/231.3, 231.5, 220, 218.1; 29/623.1; 423/306, 599
See application file for complete search history.

(56) References Cited

U.S. PATENT DOCUMENTS

| 5,763,120 A * | 6/1998 | Saidi et al. .................. 429/224 |
| 2001/0039125 A1 | 11/2001 | Hara |
| 2002/0122984 A1* | 9/2002 | Sakai et al. .............. 429/231.1 |

FOREIGN PATENT DOCUMENTS

| JP | 10-512712 | 12/1998 |
| JP | 11-26449 | 1/1999 |
| JP | 11-87342 | 3/1999 |
| JP | 2000-156246 | 6/2000 |
| JP | 2001-143689 | 5/2001 |

* cited by examiner

*Primary Examiner*—Michael Barr
*Assistant Examiner*—Monique Wills
(74) *Attorney, Agent, or Firm*—Sonnenschein Nath & Rosenthal LLP

(57) ABSTRACT

The present invention relates to a nonaqueous electrolyte battery comprising: a cathode including a positive active material; an negative including a negative active material and a nonaqueous electrolyte, wherein assuming that the first charging capacity of the positive active material per gram is Cc [mAh/g], the weight of the positive active material is Cw [g], the first charging capacity of the negative active material per gram is Ac [mAh/g], the first discharging capacity is Ad [mAh/g] and the weight of the negative active material is Aw [g], the value of X [%] represented by a formula 16 is located within a range expressed by $20 \leq X \leq 50$.

$$\frac{(Ac - Ad) \times Aw}{Cc \times Cw} \times 100 = X \quad \text{(formula 16)}$$

Thus, the deterioration of a capacity due to charging and discharging cycles is suppressed.

5 Claims, 5 Drawing Sheets

NONAQUEOUS ELECTROLYTE BATTERY AND METHOD FOR MANUFACTURING IT, AND POSITIVE ACTIVE MATERIAL, AND METHOD FOR PRODUCING IT

BACKGROUND OF THE INVENTION

The present invention relates to a nonaqueous electrolyte battery using a nonaqueous electrolyte for a battery reaction and a method for manufacturing it, and a positive active material and a method for producing it, and more particularly to a nonaqueous electrolyte battery and a method for manufacturing it in which preferable battery characteristics can be obtained, and a positive active material and a method for producing it.

Since lithium-ion secondary batteries have characteristics of light-weight and high energy density, they have been widely employed for mobile devices such as note book type personal computers, portable telephones, camcorders, etc. In the lithium-ion secondary batteries which are currently put to practical use, $LiCoO_2$ of a layered rock salt structure is employed for a positive active material, however, cobalt is poor in resources and expensive, so that positive active materials are groped for in place of cobalt. Under the circumstances, $LiNiO_2$ and $LiMn_2O_4$ have been known as materials functioning as positive active materials of the grade of 4 V and anticipated as active materials of a next generation.

However, since $LiNiO_2$ is unstable in view of a crystal structure, its practical use has been delayed, and accordingly, $LiNiO_2$ remains to be partly used only for certain kinds of devices. In the fields that will require large batteries of electric vehicles or the like in future, since it is anticipated that $LiCoO_2$ and $LiNiO_2$ are high in their cost and low in their reliability, there have been developed batteries using a spinel type lithium manganese oxide ($LiMn_2O_4$) low in its cost and high in its reliability.

However, since the crystal structure of the spinel type lithium manganese oxide is unstable in the above-described lithium-ion secondary battery, there is a possibility that a battery capacity is lowered when charging and discharging operations are repeated.

Further, when the lithium-ion secondary battery is stored at high temperature, manganese is eluted from a cathode using the spinel type lithium manganese oxide into electrolyte solution so that the eluted manganese is deposited on an anode. Thus, in the lithium-ion secondary battery, manganese deposited on the anode becomes a coat to prevent the doping and dedoping actions of lithium ions upon charging and discharging operations, which may possibly cause the battery capacity to be deteriorated.

SUMMARY OF THE INVENTION

The present invention was proposed by taking the above-described circumstances into consideration and it is an object of the present invention to provide a nonaqueous electrolyte battery in which the deterioration of a capacity due to charging and discharging cycles can be suppressed and a method for manufacturing this nonaqueous electrolyte battery.

It is another object of the present invention to provide a positive active material whose cathode performance is excellent even when charging and discharging operations are carried out or the battery is stored at high temperature and a method for producing a positive active material, and a nonaqueous electrolyte battery using this positive active material and a method for manufacturing a nonaqueous electrolyte battery.

A nonaqueous electrolyte battery according to the present invention comprises a cathode including a positive active material having a spinel type lithium manganese oxide; an anode including a negative active material capable of being doped with or dedoped from lithium; and a nonaqueous electrolyte provided between the cathode and the anode, wherein assuming that the first charging capacity of the positive active material per gram is Cc [mAh/g], the weight of the positive active material is Cw [g], the first charging capacity of the negative active material per gram is Ac [mAh/g], the first discharging capacity is Ad [mAh/g] and the weight of the negative active material is Aw [g], the value of X [%] represented by a formula 1 is located within a range expressed by $20 \leq X \leq 50$.

$$\frac{(Ac - Ad) \times Aw}{Cc \times Cw} \times 100 = X \quad \text{(formula 1)}$$

In the nonaqueous electrolyte battery, since the rate of each of the positive active material and the negative active material is adjusted so as to satisfy the formula 1, an area in which the capacity of the positive active material is severely reduced is not employed.

Further, the present invention relates to a method for manufacturing a nonaqueous electrolyte battery comprising a cathode including a positive active material having a spinel type lithium manganese oxide; an anode including a negative active material capable of being doped with or dedoped from lithium; and a nonaqueous electrolyte provided between the cathode and the anode, wherein assuming that the first charging capacity of the positive active material per gram is Cc [mAh/g], the weight of the positive active material is Cw [g], the first charging capacity of the negative active material per gram is Ac [mAh/g], the first discharging capacity is Ad [mAh/g] and the weight of the negative active material is Aw [g], the amount of the positive active material and the amount of the negative active material are adjusted so that the value of X [%] expressed by a formula 2 satisfies a range expressed by $20 \leq X \leq 50$.

$$\frac{(Ac - Ad) \times Aw}{Cc \times Cw} \times 100 = X \quad \text{(formula 2)}$$

In the method for manufacturing a nonaqueous electrolyte battery, since the rate of each of the positive active material and the negative active material is adjusted so as to satisfy the formula 2, an area in which the capacity of the positive active material is severely reduced is not employed.

Further, a positive active material according to the present invention wherein the positive active material includes a spinel type lithium manganese oxide expressed by a formula 3 in which a part of manganese (Mn) is replaced by a transition metal M.

$$LiM_yMn_{2-y}O_4 \quad \text{(formula 3)}$$

As the transition metal M by which manganese (Mn) is replaced in the formula 3, chromium is preferable.

Since the positive active material includes the spinel type lithium manganese oxide in which a part of manganese (Mn) is replaced by the transition metal M such as chromium, a good cathode performance such as an excellent stability relative to high temperature or voltage is obtained.

Still further, a method for producing a positive active material wherein a compound including lithium (Li), manganese (Mn) and/or a compound including manganese (Mn) and a transition metal M and/or a compound including a transition metal M are mixed together in the prescribed ratio and the mixture is sintered at prescribed temperature to produce a spinel type lithium manganese oxide expressed by a formula 4 in which a part of manganese (Mn) is replaced by the transition metal M.

$$LiM_yMn_{2-y}O_4 \quad \text{(formula 4)}$$

In this formula 4, the transition metal M by which manganese (Mn) is replaced is desirably chromium.

In the method for producing a positive active material, when the spinel type lithium manganese oxide is produced, a part of manganese (Mn) is replaced by the transition metal M such as chromium, so that a good positive active material having an excellent stability relative to high temperature or voltage is produced.

Still further, a nonaqueous electrolyte battery according to the present invention comprises a cathode including a positive active material, an anode including a negative active material and an electrolyte provided between the cathode and the anode, wherein the positive active material includes a spinel type lithium manganese oxide expressed by a formula 5 in which a part of manganese (Mn) is replaced by a transition metal M.

$$LiM_yMn_{2-y}O_4 \quad \text{(formula 5)}$$

In the formula 5, as the transition metal M by which manganese (Mn) is replaced, chromium is preferable.

In the nonaqueous electrolyte battery, since the positive active material includes the spinel type lithium manganese oxide in which a part of manganese (Mn) is replaced by the transition metal M such as chromium and excellent in its stability when the nonaqueous electrolyte battery is stored at high temperature or charged and discharged, the deterioration of the positive active material is suppressed and battery characteristics are improved.

Still further, in a method for manufacturing a nonaqueous electrolyte battery according to the present invention, is manufactured a battery comprising a cathode including a positive active material, an anode including a negative active material and an electrolyte provided between the cathode and the anode, wherein a spinel type lithium manganese oxide expressed by a formula 6 in which a part of manganese (Mn) is replaced by a transition metal M is used as the positive active material.

$$LiM_yMn_{2-y}O_4 \quad \text{(formula 6)}$$

In the formula 6, as the transition metal M by which manganese (Mn) is replaced, chromium is desirably used.

In the method for manufacturing a nonaqueous electrolyte battery, since the spinel type lithium manganese oxide in which a part of manganese (Mn) is replaced by the transition metal M such as chromium is employed as the positive active material, the cathode including the positive active material shows an excellent stability relative to high temperature or voltage. Thus, the nonaqueous electrolyte battery is manufactured in which the deterioration of the cathode when the nonaqueous electrolyte battery is stored at high temperature or charged and discharged is suppressed and battery characteristics are improved.

DETAILED DESCRIPTION OF THE PRESENTLY PREFERRED EMBODIMENTS

Now, as a first embodiment, a nonaqueous electrolyte battery and a method for manufacturing a nonaqueous electrolyte battery to which the present invention is applied will be described in detail.

Figure 1:
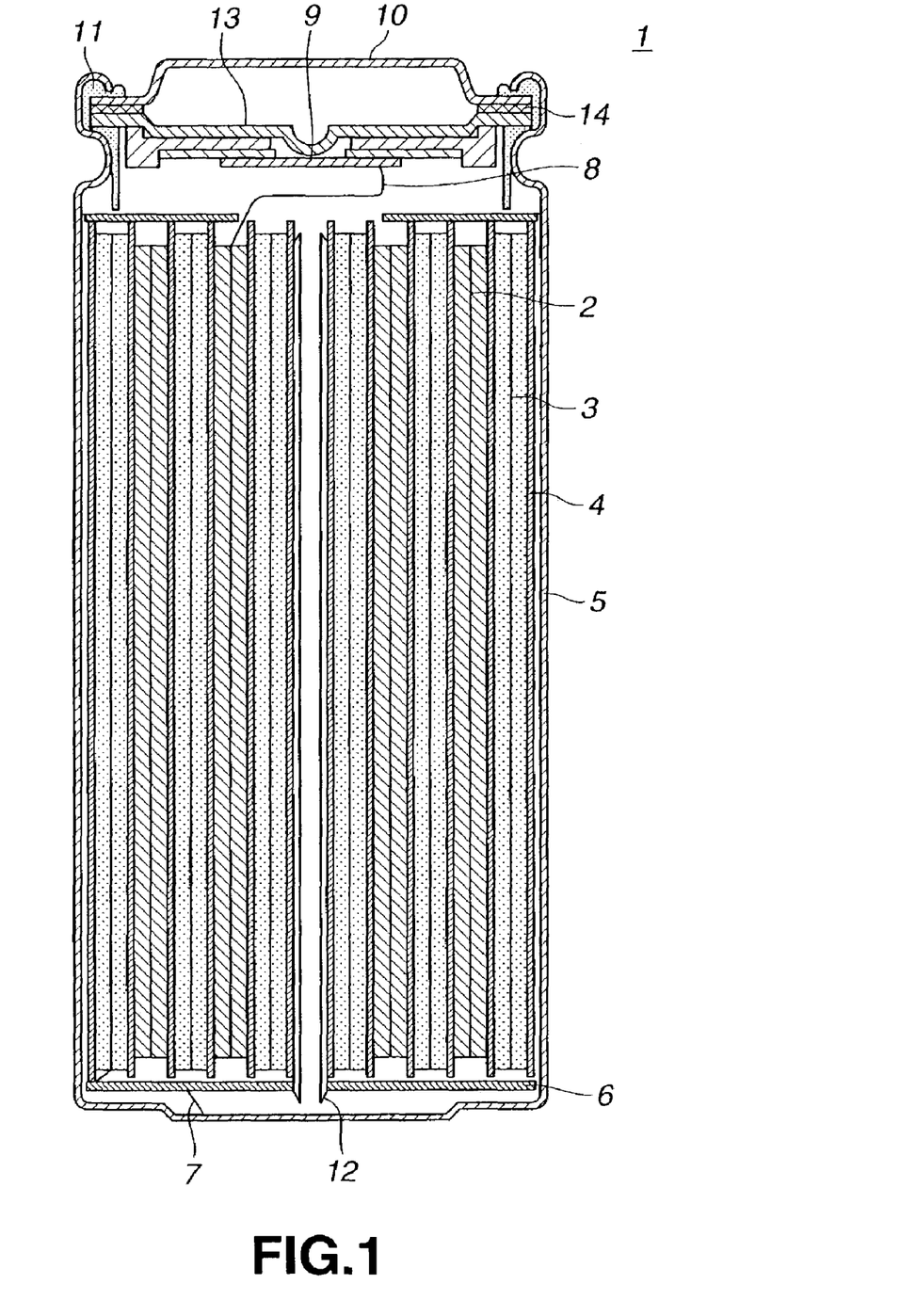
FIG. 1 is a longitudinally sectional view showing one structural example of a nonaqueous electrolyte battery according to the present invention.

FIG. 1 is a longitudinally sectional view showing one structural example of a nonaqueous electrolyte battery of the present invention. In the nonaqueous electrolyte battery 1, a battery can 5 is accommodated with a spirally coiled body in which a film type cathode 2 and a film type anode 3 are spirally coiled through a separator 4 in a tightly contacted state.

The cathode 2 is formed by applying a cathode composite mixture including a positive active material and a binding agent to a current collector and drying the cathode composite mixture. As the current collector, a metallic foil such as an aluminum foil is used.

As the positive active material, a spinel type lithium manganese oxide expressed by a general formula $LiMn_{2-x-y}M_yO_4$ is employed for all or a part thereof. Here, in the formula, x is 0.9 or larger and y is located within a range expressed by $0.01 \leq y \leq 0.5$. M indicates one or more kinds of elements selected between Fe, Co, Ni, Cu, Zn, Al, Sn, Cr, V, Ti, Mg, Ca and Sr. The spinel type lithium manganese oxide may be mixed with lithium cobalt oxide or lithium nickel oxide and the mixture may be used. A basic composition of the spinel type lithium manganese oxide is represented as $LiMn_2O_4$. However, a composition constituted by replacing a part of Mn by an element except Mn or a part of O by an element except O may be included in the spinel type lithium manganese oxide.

As the above-described binding agent of the cathode composite mixture, not only a well-known binding agent ordinarily used for the cathode composite mixture of the battery can be used, but also a well-known addition agent such as a conductive agent can be added to the cathode composite mixture.

The anode 3 is formed by applying an anode composite mixture including a negative active material and a binding agent on a current collector and drying the anode composite mixture. As the current collector, a metallic foil such as a copper foil is used.

As the negative active material, a carbon material or an alloy material is employed. As the carbon material, materials capable of being doped with or dedoped from lithium may be used. There may be used a low crystalline carbon material obtained by sintering a material at relatively low temperature such as 2000° C. or lower or a high crystalline material such as artificial graphite obtained by treating a material which is easily crystallized at high temperature such as about 3000° C. or natural graphite. For instance, there can be used pyrocarbons, coke, graphites, vitreous carbons, organic polymer compound sintered body obtained by sintering and carbonizing furan resins or the like at suitable temperature, carbon fibers, activated carbon, etc.

As the binding agent of the negative composite mixture, not only a well-known binding agent ordinarily used for the negative composite mixture of a lithium-ion battery can be used, but also a well-known addition agent can be added to the negative composite mixture.

Nonaqueous electrolyte solution is prepared by dissolving an electrolyte in a nonaqueous solvent. As the electrolyte, any lithium salts dissolved in the nonaqueous solvent and showing an ionic conductivity may be used without a special limitation. Specifically, there may be exemplified, for instance, $LiPF_6$, $LiBF_4$, $LiClO_4$, $LiCF_3SO3$, $LiN(CF_3SO_2)_2$, $LiC(CF_3SO_2)_3$, etc. One kind of them may be independently employed or two or more kinds of them may be mixed and used.

As the nonaqueous solvent, it is not especially limited to a specific solvent. For instance, there may be enumerated cyclic carbonate such as ethylene carbonate, propylene carbonate, etc., chain carbonate such as dimethyl carbonate, diethyl carbonate, etc., cyclic ester such as γ-butyrolactone, γ-valerolactone, etc., chain ester such as ethyl acetate, methyl propionate, etc., ether such as tetrahydrofuran, 1,2-dimethoxyethane, etc. These nonaqueous solvents may be independently used or a plurality of kinds of them may be mixed together and the mixture may be used.

Figure 2:
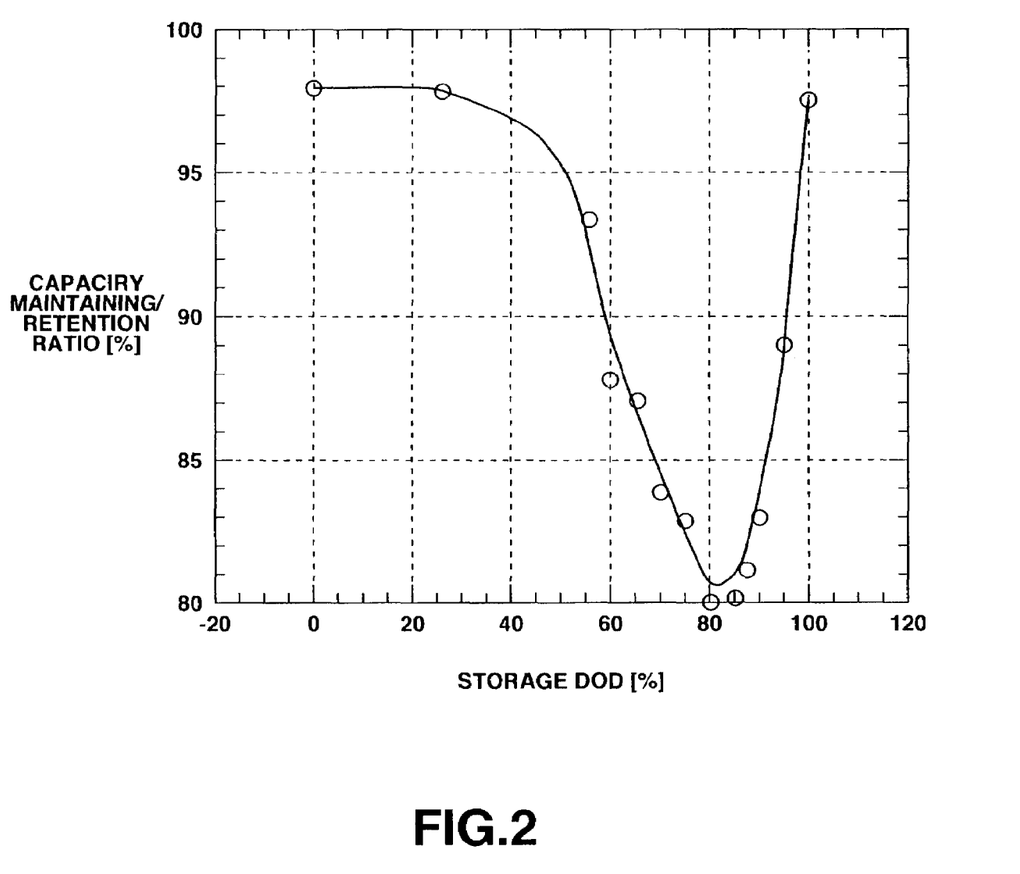
FIG. 2 is a characteristic view showing the relation between a depth of discharge and a capacity maintaining/retention ratio of a battery using a spinel type lithium manganese oxide as a positive active material.

Here, the inventors of the present invention made sure of a fact that, when the spinel type lithium manganese oxide was used for the positive active material, the deterioration of a capacity upon storage at high temperature arose while developing such a tendency as shown in FIG. 2. FIG. 2 shows a discharging capacity maintaining/retention ratio relative to a discharging capacity for a second cycle before a battery is stored at high temperature, after the battery is stored at 60° C. for 125 hours. As shown in FIG. 2, in an area where the depth of discharge of the positive active material is 50% or higher, the capacity was terribly reduced, so that the inventors obtained a knowledge that the positive active material in a part corresponding to this area was not preferably used. In order to realize the above matter, the inventors considered that the balance between the positive active material and the negative active material was optimized.

That is, the negative active material used for the lithium-ion battery has ordinarily a first charging capacity higher than a discharging capacity. In case the battery is designed, when the negative active material is used more excessively than the positive active material, the irreversible capacity of the negative will be increased depending on the amount thereof, and accordingly, a part of a deeper discharging side of the discharging capacity of the cathode is not used. In other words, when the battery is designed so that the irreversible capacity of the negative active material is smaller than 50% as high as the charging capacity of the positive active material, an area in which the capacity is terribly reduced, and the depth of discharge is 50% or higher, is not used, so that the cyclic characteristics of the battery are improved.

However, when the area where the depth of discharge is 50% or higher is not employed, the discharging capacity of the nonaqueous electrolyte battery 1 will be outstandingly reduced. Therefore, actually, an area where the depth of discharge is about 50% to 80% or higher may not be preferably used.

Assuming that the first charging capacity of the positive active material per gram is Cc [mAh/g], the weight of the positive active material is Cw [g], the first charging capacity of the negative active material per gram is Ac [mAh/g], the first discharging capacity is Ad [mAh/g] and the weight of the negative active material is Aw [g], the above-described matter will be described by using a formula. At this time, in the nonaqueous electrolyte battery 1 according to the present invention, the amount of the positive active material and the amount of the negative active material are adjusted so that the value of X [%] represented by a below-described formula 7, that is, the rate of the irreversible capacity of the negative relative to the charging capacity of the cathode satisfies a range expressed by $20 \leq X \leq 50$.

$$\frac{(Ac - Ad) \times Aw}{Cc \times Cw} \times 100 = X \quad \text{(formula 7)}$$

In such a manner, the balance between the positive active material and the negative active material is adjusted so as to avoid the use of a deep discharge part of the positive active material in which the depth of discharge is 50% or higher, so that the use of an area where a capacity is severely reduced can be avoided. Thus, the cyclic characteristics of the nonaqueous electrolyte battery 1 can be improved. In the formula 7, when the value of X is smaller than 20[%], the parts of the active materials which are used for charging and discharging operations are decreased, which may possibly cause the capacity of the battery to be lowered. Further, when the value of X is smaller than 50[%], an area where the capacity is severely reduced and the depth of discharge is 50% or higher is employed, which results in the deterioration of the cyclic characteristics of the battery.

The above-described nonaqueous electrolyte battery 1 is manufactured in the following manner. The cathode 2 is manufactured by uniformly applying the cathode composite mixture including the positive active material and the binding agent on a metallic foil such as an aluminum foil serving as a cathode current collector and drying the cathode composite mixture to form a positive active material layer. As the binding agent of the cathode composite mixture, not only the well-known binding agent can be used, but also the well-known addition agent can be added to the cathode composite mixture.

The negative 3 is manufactured by uniformly applying the negative composite mixture including the negative active material and the binding agent on a metallic foil such as a copper foil serving as an negative current collector and drying the negative composite mixture to form a negative active material layer. As the binding agent of the negative composite mixture, not only the well-known binding agent can be used, but also the well-known addition agent or the like can be added to the negative composite mixture.

According to the present invention, the amount of the positive active material and the amount of the negative active material are adjusted so that the value of X [%] represented by a below-described formula 8 satisfies a range expressed by $20 \leq X \leq 50$.

$$\frac{(Ac - Ad) \times Aw}{Cc \times Cw} \times 100 = X \qquad \text{(formula 8)}$$

Here, in the formula 8, Cc designates a first charging capacity [mAh/g] of the positive active material per gram and Cw designates the weight [g] of the positive active material. Further, Ac designates a first charging capacity [mAh/g] of the negative active material per gram and Ad designates a first discharging capacity [mAh/g]. Aw designates the weight [g] of the negative active material.

The balance between the negative active material and the positive active material is adjusted as shown in the formula 8, so that the use of the positive active material located in an area where the capacity is severely reduced can be avoided. Thus, the cyclic characteristics of the nonaqueous electrolyte battery 1 can be improved.

The cathode 2 and the negative 3 obtained as mentioned above are allowed to come into tightly contact with each other through the separator 4 made of a microporous polypropylene film and spirally coiled many times to form a spirally coiled body.

Then, an insulating plate 6 is inserted to the bottom part of an iron battery can 5 whose inside is plated with nickel and the spirally coiled body is further accommodated therein. Then, in order to collect the electric current of the negative, one end of an negative lead 7 made of, for example, nickel is attached to the negative 3 and the other end is welded to the battery can 5. Thus, the battery can 5 is electrically conducted to the negative 3 to serve as an outer negative of the nonaqueous electrolyte battery 1. Further, in order to collect the electric current of the cathode 2, one end of a cathode lead 8 made of, for instance, aluminum is attached to the cathode 2 and the other end is electrically connected to a battery cover 10 through a current cutting-off thin plate 9. The current cutting-off thin plate 9 cuts off the electric current depending on the internal pressure of the battery. Thus, the battery cover 10 is electrically conducted to the cathode 2 to serve as an outer cathode of the nonaqueous electrolyte battery 1.

Then, nonaqueous electrolyte solution is injected into the battery can 5. This nonaqueous electrolyte solution is prepared by dissolving an electrolyte in a nonaqueous solvent. Subsequently, the battery can 5 is caulked through an insulating sealing gasket 11 to which asphalt is applied so that the battery cover 10 is fixed to the battery can 5 to form the cylindrical nonaqueous electrolyte battery 1.

In the nonaqueous electrolyte battery 1, as shown in FIG. 1, a mandrel 12 connected to the negative lead 7 and the cathode lead 8 is provided and a safety valve device 13 for purging gas in the battery when pressure in the battery is higher than a prescribed value and a PTC (positive temperature coefficient) element 14 for preventing the rise of temperature in the battery are provided.

Since the balance between the negative active material and the positive active material in the nonaqueous electrolyte battery 1 obtained as described above is adjusted, the use of the positive active material located in the area in which the capacity is terribly reduced is avoided, and accordingly, the battery has excellent cyclic characteristics.

Now, a positive active material and a method for producing a positive active material to which the present invention is applied and a nonaqueous electrolyte battery using the positive active material and a method for manufacturing a nonaqueous electrolyte battery will be described as a second embodiment.

The positive active material of the present invention is composed of a spinel type lithium manganese oxide represented by a general formula $LiM_yMn_{2-y}O_4$ in which a part of manganese (refer it to as Mn, hereinafter) is replaced by a transition metal M.

The spinel type lithium manganese oxide in which a part of Mn is replaced by the transition metal M is extremely excellent in its stability relative to storage at high temperature or voltage. Accordingly, in a battery using this composite oxide as the positive active material, since the stability of the positive active material is greatly excellent even when the battery is stored at high temperature or charged and discharged, Mn is prevented from being eluted to be deposited on an negative and form a coat including Mn. Thus, the deterioration of battery characteristics such as a battery capacity, charging and discharging characteristics, etc. can be suppressed without preventing the doping and dedoping actions of lithium ions on the negative.

As the transition metals M by which a part of Mn in the spinel type lithium manganese oxide is replaced, chromium (refer it to as Cr, hereinafter) or the like may be exemplified. The valence number y of the transition metal M preferably ranges from 0.15 to 0.2. In the following description, although an example in which Cr is used as the transition metal M is explained, the present invention may be applied to the transition metals M except Cr.

Here, a coin type battery is manufactured by employing the spinel type lithium manganese oxide as the positive active material and an experimental result obtained when an elution amount of Mn of the positive active material of the battery relative to the depth of discharge at 60° C. is measured will be described below.

In order to manufacture the coin type battery, $LiMn_2O_4$ or the like as the positive active material, polyvinylidene fluoride or the like as a binding agent and graphite or the like as a conductive material are initially mixed in the prescribed mixing ratio to prepare a cathode composite mixture. Then, the cathode composite mixture is dispersed in N-methyl-2-pyrrolidone or the like as a solvent to produce cathode composite mixture coating liquid. Then, the cathode composite mixture coating liquid is applied on a main surface of an elongated aluminum foil as a current collector having the thickness of 20 m so as to have an even thickness and dried. Then, the aluminum foil with the coating liquid applied and dried is compression-molded by a roll press machine and then punched to a disc form having a diameter of about 15 mm so that a cathode is formed.

After that, metallic lithium having the thickness of about 1 mm is punched so as to form a disc form slightly larger than the cathode so that an negative is formed. Then, the cathode and the negative are sealed in an outer jacket material having the diameter of about 20 mm and the thickness of about 16 mm together with electrolyte solution obtained by dissolving $LiPF_6$ as an electrolyte in the mixed solvent of ethylene carbonate and dimethyl carbonate. In such a manner, the coin type battery was manufactured.

Then, in order to measure the elution amount of Mn from the positive active material relative to the depth of discharge in the coin type battery manufactured as mentioned above, charging and discharging operations that the coin type battery is charged to 4.2 V under a prescribed current value and discharged to 3.0 V under a prescribed current value are initially carried out two times. Subsequently, after the coin type battery is charged to 4.2 V under a prescribed current value, the battery is discharged under a prescribed current value until a prescribed depth of discharge is obtained and the battery is stored under the atmosphere of 60° C. for 125 hours. Then, charging and discharging operations that the coin type battery after the storage is charged to 4.2 V under a prescribed current value and discharged to 3.0 V under a prescribed current value are carried out three times. Then, the coin type battery is dismantled and the surface of the metallic lithium serving as the negative is dissolved by nitric acid solution to have sample solution. Then, Mn in the sample solution is determined by an emission spectral analysis using an inductively coupled plasma. In such a manner, the amount of Mn from the positive active material was measured.

Figure 3:
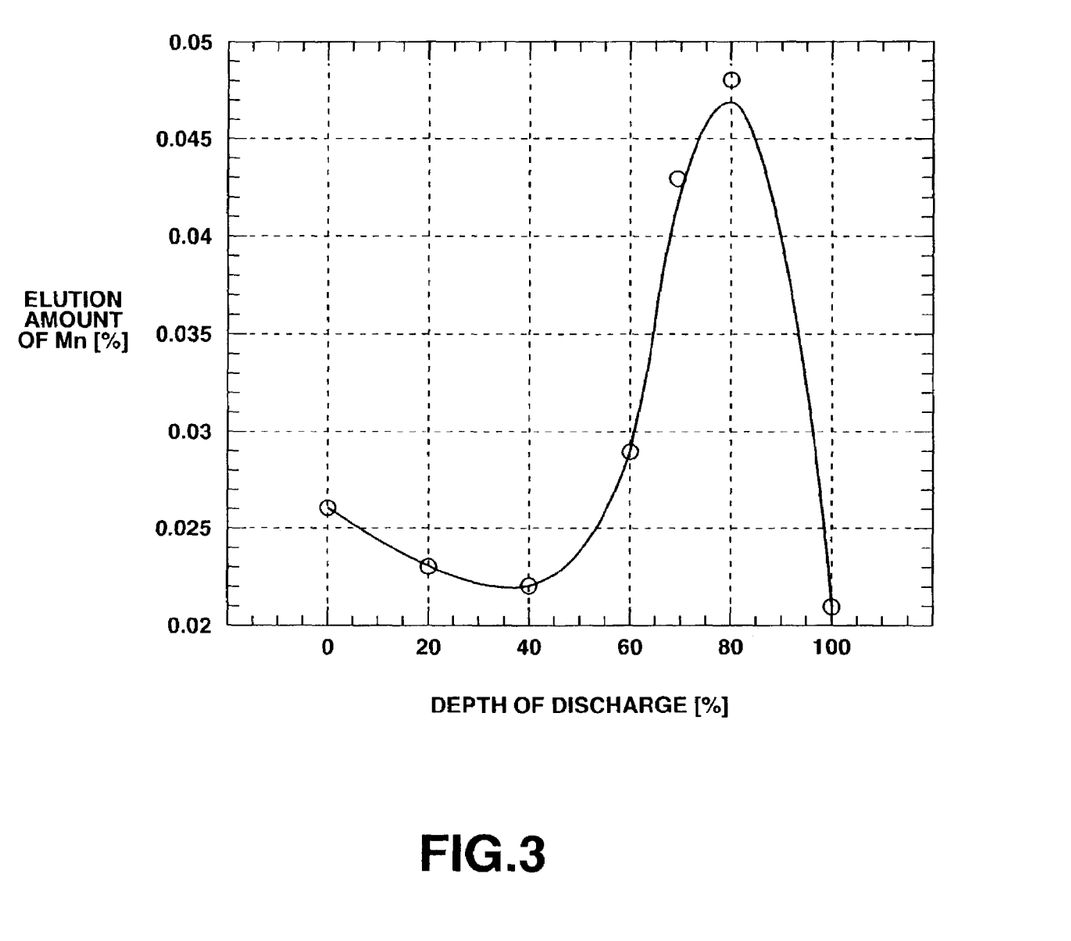
FIG. 3 is a characteristic view showing the relation between a depth of discharge and an elution amount of Mn in a coin type battery using a spinel type lithium manganese oxide as a positive active material.

The relation between the depth of discharge at 60° C. and the elution amount of Mn in the coin type battery measured as described above is shown in FIG. 3. FIG. 3 is a characteristic view showing the relation between the depth of discharge at 60° C. in the coin type battery and the elution amount of Mn.

As apparent from the characteristic view shown in FIG. 3, as the depth of discharge goes to 40% from 0%, that is, a charged state under 4.2V, the elution amount of Mn decreases. However, the elution amount of Mn abruptly increases from the depth of discharge of 40% and reaches a maximum value when the depth of discharge is 80%. When the depth of discharge goes to 100% from the depth of discharge of 80%, that is, the battery is discharged to 3.0 V, the elution amount of Mn is abruptly decreases.

FIG. 3 shows a result obtained by measuring the elution amount of Mn when a spinel type lithium manganese oxide in which a part of Mn is not replaced by the transition metal M is used for the positive active material of the coin type battery.

On the other hand, in the positive active material to which the present invention is applied, since a part of Mn of the spinel type lithium manganese oxide is replaced by the transition metal M such as Cr, a stability for a storage at high temperature or a charging operation is improved. Thus, an elution amount of Mn can be greatly suppressed. An elution amount of Mn is preferably 0.035% or lower and further preferably 0.03% or lower. Accordingly, even when the battery using this composite oxide as the positive active material is stored at high temperature or charged and discharged, the elution of Mn from the positive active material, the deposition of Mn on the negative and the formation of a coat including Mn are suppressed. Consequently, the deterioration of battery characteristics such as a battery capacity or charging and discharging characteristics, etc. can be suppressed without preventing the doping and dedoping actions of lithium ions on the negative.

Figure 4:
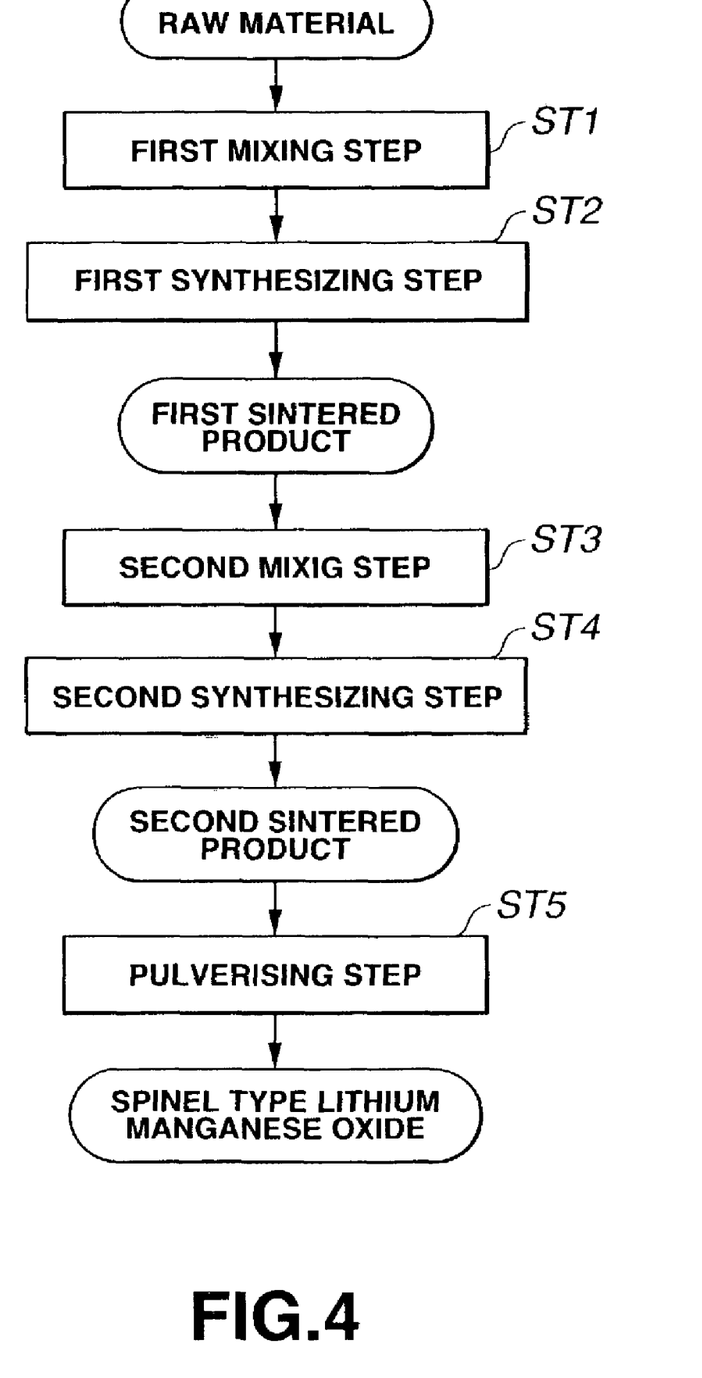
FIG. 4 is a flow chart for manufacturing the positive active material in the present invention.

For producing the spinel type lithium manganese oxide in which apart of Mn is replaced by the transition metal M such as Cr, as shown in FIG. 4, for instance, lithium carbonate, manganese dioxide and chromium oxide as raw materials are initially respectively weighed so as to have a prescribed ratio and adequately mixed together by a mixer in a first mixing step as step-1. Then, the mixed raw materials are sintered for 12 hours by, for example, a sintering furnace such as an electric furnace under atmosphere of air at 750° C. to synthesize a first sintered product in a first synthesizing step as step-2.

Then, the first sintered product is taken out from the sintering furnace in a second mixing step as step-3 and mixed again by the mixer. After that, the first sintered product which is mixed again is sintered again for 12 hours by the sintering furnace under the atmosphere of air at 750° C. to synthesize a second sintered product in a second synthesizing step as step-4.

Subsequently, the second sintered product is taken out from the sintering furnace to pulverize the second sintered product by a pulverizer in a pulverizing step as step-5. In such a manner, the spinel type lithium manganese oxide represented by the general formula $LiM_yMn_{2-y}O_4$ in which a part of Mn is replaced by the transition metal M can be produced. In the description of the method for producing the spinel type lithium manganese oxide, although the specific value is employed for, for instance, sintering temperature, the present invention may not be limited thereto.

At this time, in the method for synthesizing the spinel type lithium manganese oxide, the mixing ratio of the raw materials is desirably set and synthesized in the step-1 so that the valence number y of the transition metal M by which a part of Mn in the composite oxide is replaced ranges from 0.15 to 0.2. Thus, in the method for synthesizing this composite oxide, the spinel type lithium manganese oxide very excellent in its stability relative to storage at high temperature or voltage can be synthesized.

Now, a nonaqueous electrolyte battery using the spinel type lithium manganese oxide synthesized as described above as a positive active material will be described below.

Figure 5:
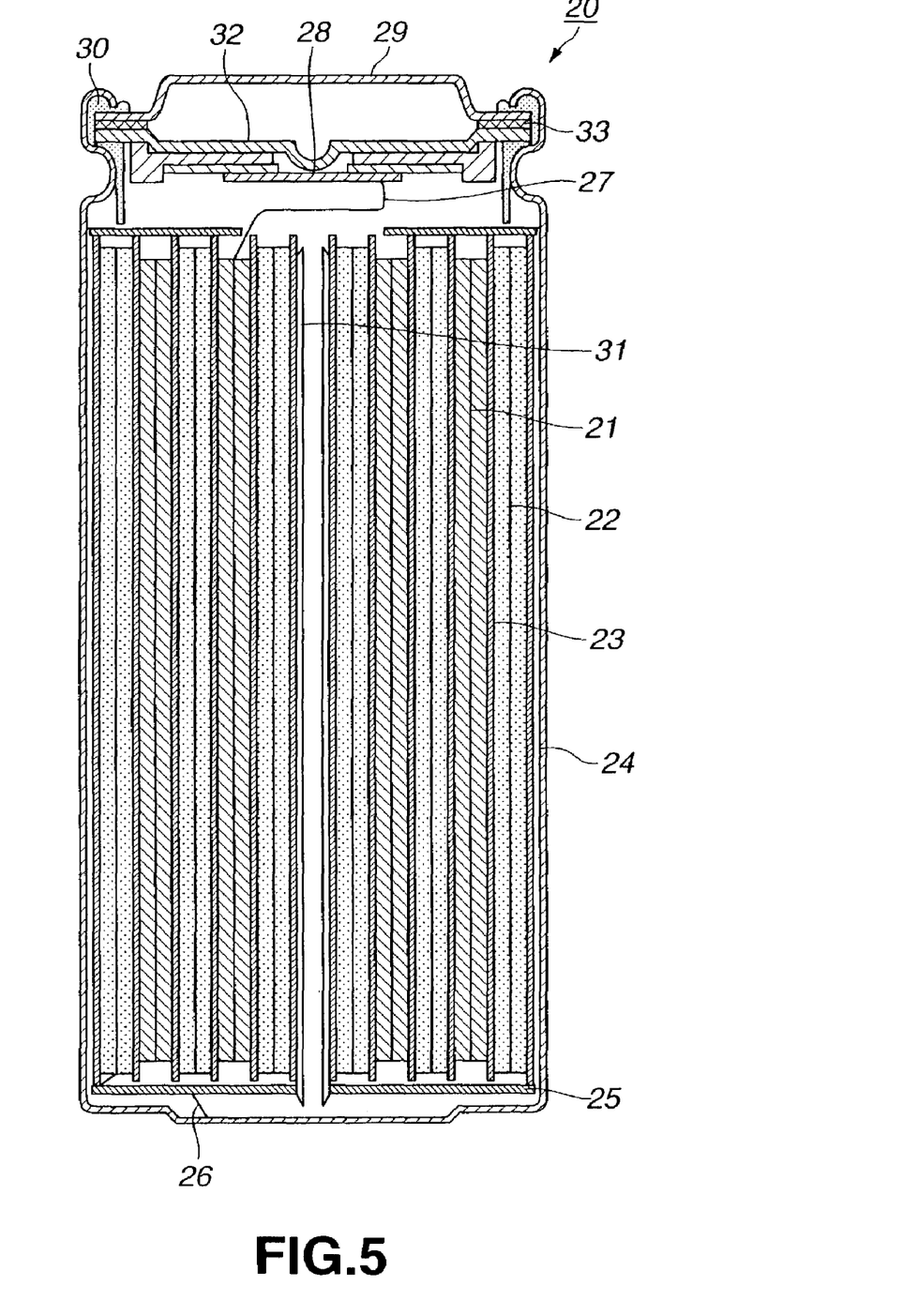
FIG. 5 is a longitudinal sectional view showing another structural example of the nonaqueous electrolyte battery.

FIG. 5 is a longitudinally sectional view showing one structural example of a nonaqueous electrolyte battery 20 using the above-described positive active material. In the nonaqueous electrolyte battery 20, a battery can 24 is accommodated with a spirally coiled body in which a film type cathode 21 and a film type negative 22 are spirally coiled through a separator 23 in a tightly contacted state like the above-described nonaqueous electrolyte battery 1.

The cathode 21 is formed by applying a cathode composite mixture including a positive active material and a binding agent to a current collector and drying the cathode composite mixture. As the current collector, a metallic foil such as an aluminum foil is used.

As the positive active material, is used the spinel type lithium manganese oxide synthesized by the above-described producing method in which a part of Mn is replaced by the transition metal M such as Cr. As the spinel type lithium manganese oxide, there may be used a mixture of a plurality of kinds of materials of lithium cobalt oxide ($LiCoO_2$), lithium nickel oxide ($LiNiO_2$), etc.

As the binding agent of the cathode composite mixture, not only a well-known binding agent ordinarily used for the cathode composite mixture of the battery can be used, but also a well-known addition agent such as a conductive agent can be added to the cathode composite mixture.

The negative 22 is formed by applying an negative composite mixture including a negative active material and a binding agent on a current collector and drying the negative composite mixture. As the current collector, a metallic foil such as a copper foil is used. For the negative 22, a material the same as that of the negative 3 in the nonaqueous electrolyte battery 1 is employed.

Electrolyte solution is prepared by employing the same materials as those of the electrolyte solution of the above-described nonaqueous electrolyte battery and dissolving an electrolyte in a nonaqueous solvent.

In the nonaqueous electrolyte battery 20 constructed as mentioned above, since the positive active material is composed of the spinel type lithium manganese oxide represented by the general formula $LiM_yMn_{2-y}O_4$ in which a part of Mn is replaced by the transition metal M such as Cr, and even when the nonaqueous electrolyte battery is stored at high temperature or charged and discharged, the stability of the positive active material is extremely excellent, Mn is prevented from being eluted from the cathode 21 to be deposited on the negative 22 and form a coat including Mn. Accordingly, the deterioration of a battery capacity or battery characteristics such as charging and discharging characteristics can be suppressed.

The above-described nonaqueous electrolyte battery 20 is manufactured in the following manner. The cathode 21 is manufactured by uniformly applying the cathode composite mixture including the positive active material composed of the spinel type lithium manganese oxide in which a part of Mn is replaced by the transition metal M such as Cr, the conductive agent and the binding agent on a cathode current collector made of a metallic foil such as an aluminum foil and drying the cathode composite mixture to form a positive active material layer. As the conductive agent and the binding agent of the cathode composite mixture, not only the well-known conductive agent and the binding agent can be used, but also the well-known addition agent can be added to the cathode composite mixture.

The negative 22 is manufactured by uniformly applying the negative composite mixture including a carbon material as the negative active material and the binding agent on an negative current collector made of a metallic foil such as a copper foil and drying the negative composite mixture to form a negative active material layer. As the binding agent of the negative composite mixture, not only the well-known binding agent can be used, but also the well-known addition agent or the like can be added to the negative composite mixture.

The cathode 21 and the negative 22 obtained as mentioned above are laminated through the separator 23 made of, for instance, a microporous polypropylene film and the laminated body is spirally coiled many times to form a battery element.

Then, an insulating plate 25 is inserted to the bottom part of an iron battery can 24 whose inside is plated with nickel and the battery element is further accommodated therein. Then, in order to collect the electric current of the negative 22, one end of an negative terminal 26 made of, for example, nickel is attached to the negative current collector and the other end is welded to the battery can 24. Thus, the battery can 24 is electrically conducted to the negative 22 to serve as an external negative of the nonaqueous electrolyte battery 20. Further, in order to collect the electric current of the cathode 21, one end of a cathode terminal 27 made of, for instance, aluminum is attached to the cathode 21 and the other end is welded to a current cutting-off thin plate 28 so that the cathode terminal 27 is electrically connected to a battery cover 29 through the current cutting-off thin plate 28. The current cutting-off thin plate 28 cuts off the electric current depending on the internal pressure of the battery. Thus. the battery cover 29 is electrically conducted to the cathode 21 to serve as an external cathode of the nonaqueous electrolyte battery 20.

Then, nonaqueous electrolyte solution is injected into the battery can 24. This nonaqueous electrolyte solution is prepared by dissolving an electrolyte in a nonaqueous solvent. Subsequently, the battery can 24 is caulked through an insulating sealing gasket 30 to which asphalt is applied so that the battery cover 29 is fixed to the battery can 24 to form a cylindrical nonaqueous electrolyte battery 20.

In the nonaqueous electrolyte battery 20, a mandrel 31 connected to the negative terminal 26 and the cathode terminal 27 is provided and a safety valve 32 for purging gas in the battery when pressure in the battery is higher than a prescribed value and a PTC (positive temperature coefficient) element 33 for preventing the rise of temperature in the battery are provided in a similar way to the above-described nonaqueous electrolyte battery 1.

Since the nonaqueous electrolyte battery 20 obtained as described above employs the spinel type lithium manganese oxide represented by the general formula $LiM_yMn_{2-y}O_4$ in which a part of Mn is replaced by the transition metal M such as Cr and even when the nonaqueous electrolyte battery is stored at high temperature or charged and discharged, the stability of the positive active material is greatly excellent, Mn is prevented from being eluted from the cathode 21 to be deposited on the negative 22 and form a coat including Mn. Accordingly, an excellent nonaqueous electrolyte battery 20 is obtained in which the deterioration of battery characteristics such as a battery capacity, charging and discharging characteristics, etc. can be suppressed without preventing the doping and dedoping actions of lithium ions on the negative 22.

In the above-described embodiments, although the nonaqueous electrolyte batteries using the nonaqueous electrolyte solution are explained as examples, the present invention is not limited thereto, and may be applied to a solid electrolyte battery using a solid polymer electrolyte including a simple substance or the mixture of conductive polymer compounds or a gel electrolyte battery using a gel type solid electrolyte including a swelling solvent.

Further, in the above-described embodiments, although the secondary battery is described as an example, the present invention is not limited thereto and may be applied to a primary battery. The form of the battery according to the invention is not especially limited to a specific form such as a cylindrical form, a prismatic form, a coin form, a button form, etc., and the present invention may be applied to various kinds of size such as a thin form, a large form, etc.

EXAMPLES

Now, samples manufactured to recognize the effects of the present invention will be described below.

(Sample 1)

Initially, a cathode was manufactured as described below. $LiMn_2O_4$ (a first charging capacity is 108 mAh/g) of 91 parts by weight as a positive active material, polyvinylidene fluoride of 3 parts by weight as a binding agent and graphite of 6 parts by weight as a conductive agent were mixed together to prepare a cathode composite mixture. This cathode composite mixture was dispersed in N-methyl-2-pyrrolidone as a solvent to have slurry. Then, the cathode composite mixture slurry was uniformly applied on both the surfaces of an elongated aluminum foil serving as a cathode current collector and having the thickness of 20 m and dried. Then, the aluminum foil having the cathode composite mixture applied and dried was compression-molded by a roll press machine to form an elongated cathode.

Further, an negative was manufactured as described below. Graphite (a first charging capacity is 345 mAh/g and a first discharging capacity is 312 mAh/g) of 90 parts by weight as a negative active material and polyvinylidenefluoride (PVdF) of 10 parts by weight as a binding agent were mixed together to prepare an negative composite mixture. This negative composite mixture was dispersed in N-methyl-2-pyrrolidone as a solvent to have slurry. Then, the negative composite mixture slurry was uniformly applied on both the surfaces of an elongated copper foil serving as an negative current collector and having the thickness of 10 m and dried. Then, the copper foil having the negative composite mixture applied and dried was compression-molded by a roll press machine to form an elongated negative.

Here, according to a formula 9 described below, the balance between the cathode and the negative was designed so as to obtain X=50[%]. In the Sample 1, the thickness of the cathode was 131 m and the thickness of the negative was 337 m.

$$\frac{(Ac - Ad) \times Aw}{Cc \times Cw} \times 100 = X \quad \text{(formula 9)}$$

In the formula 9, Cc designates a first charging capacity [mAh/g] of the positive active material per gram and Cw designates the weight [g] of the positive active material. Further, Ac designates a first charging capacity [mAh/g] of the negative active material per gram and Ad designates a first discharging capacity [mAh/g]. Aw designates the weight [g] of the negative active material. Here, the values of Cc=108 [mAh/g], Ac=345 [mAh/g] and Ad=[312 mAh/g] were used.

The elongated cathode and the elongated negative obtained as mentioned above were laminated through a separator made of a microporous polyethylene film, then stacked the negative, the separator, the cathode, and the separator respectively and the laminated body was spirally coiled many times to form a spirally coiled electrode element.

The spirally coiled electrode element thus manufactured was accommodated in a battery made of iron and plated with nickel. Insulating plates were disposed on the upper and lower surfaces of the spirally coiled electrode element. An cathode lead made of aluminum was drawn from the cathode current collector and welded to a battery cover. an negative lead made of nickel was drawn from the negative current collector and welded to the battery can.

Then, nonaqueous electrolyte solution was injected into the battery can. This nonaqueous electrolyte solution was prepared by dissolving $LiPF_6$ in the mixed solvent of ethylene carbonate and dimethyl carbonate of equal volume at the rate of 1 mol/L. Finally, the battery can was caulked through an insulating sealing gasket to which asphalt was applied so that the battery cover was fixed to the battery can to form a cylindrical nonaqueous electrolyte battery having the diameter of 18 mm and the height of 65 mm.

(Sample 2)

A nonaqueous electrolyte battery was manufactured in the same manner as that of the Sample 1 except that the balance between the cathode and the negative was designed so as to have X=40[%] in the formula 9. At this time, the thickness of the cathode was 131 m and the thickness of the negative was 270 m.

(Sample 3)

A nonaqueous electrolyte battery was manufactured in the same manner as that of the Sample 1 except that the balance between the cathode and the negative was designed so as to have X=30[%] in the formula 9. At this time, the thickness of the cathode was 131 m and the thickness of the negative was 206 m.

(Sample 4)

A nonaqueous electrolyte battery was manufactured in the same manner as that of the Sample 1 except that the balance between the cathode and the negative was designed so as to have X=20[%] in the formula 9. At this time, the thickness of the cathode was 131 m and the thickness of the negative was 141 m.

(Sample 5)

A nonaqueous electrolyte battery was manufactured in the same manner as that of the Sample 1 except that the balance between the cathode and the negative was designed so as to have X=10[%] in the formula 9. At this time, the thickness of the cathode was 131 m and the thickness of the negative was 76 m.

Now, Samples actually manufactured by using the positive active material to which the present invention is applied will be described below.

(Sample 6)

In order to synthesize the positive active material, lithium carbonate, manganese dioxide and chromium trioxide as raw materials were adequately mixed by a mixer in the mole ratio 0.25 mole to 0.9 mole to 0.05 mole. The mixture thus obtained was sintered by an electric furnace for 12 hours in air at 750° C. to produce a first sintered product. Then, the obtained first sintered product was taken out from the electric furnace, mixed again by the mixer and sintered again by the electric furnace for 12 hours in air at 750° C. to produce a second sintered product. After that, the obtained second sintered product was taken out from the electric furnace and pulverized by a pulverizer. In such a manner, $LiCr_{0.2}Mn_{1.8}O_4$ was obtained. At this time, it was recognized that the maximum value of an elution amount of Mn in $LiCr_{0.2}Mn_{1.8}O_4$ was 0.03% in accordance with a method for measuring an elution amount of Mn described in this embodiment.

Then, in order to manufacture the cathode, $LiCr_{0.2}Mn_{1.8}O_4$ thus obtained of 91 parts by weight, polyvinylidene fluoride resin (refer it to as PVDF, hereinafter) of 3 parts by weight as a binding agent, graphite of 6 parts by weight as a conductive agent and N-methyl-2-pyrrolidone (refer it to as NMP, hereinafter) as a solvent were mixed together and the mixture was kneaded and dispersed by a planetary mixer to produce cathode coating liquid. Then, the cathode coating liquid was uniformly applied to both the surfaces of an elongated aluminum foil serving as a cathode current collector and having the thickness of 20 m by using a die coater as a coater and dried. The cathode current collector having the coating liquid applied and dried was compression-molded by a roll press machine. Thus, the cathode was manufactured.

Then, in order to manufacture the negative, graphite of 90 parts by weight as a negative active material and PVDF of 10 parts by weight as a binding agent were added to NMP as a solvent and the mixture was kneaded and dispersed by a planetary mixer to produce negative coating liquid. Then, the negative coating liquid was uniformly applied to both the surfaces of an elongated copper foil serving as an negative current collector and having the thickness of 10 m by using a die coater as a coater and dried. After that, the negative current collector having the coating liquid applied and dried was compression-molded by a roll press machine. In such a manner, the negative was manufactured.

Then, in order to manufacture the battery element, a cathode terminal made of aluminum and an negative terminal made of nickel were respectively welded to the current collectors of the cathode and the negative thus obtained. A laminated body was formed by providing a separator made of a microporous polyethylene film having the thickness of 25 m between the cathode and the negative. The laminated body was spirally coiled many times to form the battery element. At this time, the cathode terminal and the negative terminal were drawn from the obtained battery element.

Subsequently, in order to manufacture the nonaqueous electrolyte battery, the cathode terminal drawn from the manufactured battery element was welded to a battery cover and the negative terminal was welded to a battery can made of iron and plated with nickel, respectively. The battery element was accommodated in the battery can. Then, nonaqueous electrolyte solution obtained by dissolving $LiPF_6$ in the mixed solvent in which ethylene carbonate and dimethyl carbonate were mixed in the volumetric mixing ratio 1:1 to have concentration of 1 mole/liter was injected into the battery can. The battery cover was fitted to the opening part of the battery can under pressure through an insulating sealing gasket to which asphalt was applied to firmly fix the battery cover to the battery can by caulking the battery can. Thus, the cylindrical nonaqueous electrolyte battery having the diameter of 18 mm and the height of 65 mm was manufactured.

(Sample 7)

In a Sample 7, $LiCr_{0.15}Mn_{1.85}O_4$ was synthesized in the same manner as that of the Sample 6 except that the mixing ratio of the raw materials was changed when the positive active material was synthesized. At this time, the elution amount of Mn in $LiCr_{0.15}Mn_{1.85}O_4$ measured by the same method as that of the Sample 6 was 0.035%. A nonaqueous electrolyte battery was manufactured in the same manner as that of the Sample 6 except that $LiCr_{0.15}Mn_{1.85}O_4$ was used as the positive active material.

(Sample 8)

In a Sample 8, a nonaqueous electrolyte battery was manufactured in the same manner as that of the Sample 6 except that the mixture of $LiCr_{0.2}Mn_{1.8}O_4$ of 72.8 parts by weight and $LiNiO_2$ of 18.2 parts by weight was used as the positive active material.

(Sample 9)

In a sample 9, a nonaqueous electrolyte battery was manufactured in the same manner as that of the Sample 6 except that $Li_{1.05}Mn_{1.95}O_4$ in which the maximum value of an elution amount of Mn recognized by the method for measuring the elution amount of Mn was 0.05% was used as the positive active material.

(Sample 10)

In a sample 10, a nonaqueous electrolyte battery was manufactured in the same manner as that of the Sample 6 except that $Li_{1.02}Mn_{1.98}O_4$ in which the maximum value of an elution amount of Mn recognized by the method for measuring the elution amount of Mn was 0.08% was used as the positive active material.

(Sample 11)

In a Sample 11, a nonaqueous electrolyte battery was manufactured in the same manner as that of the Sample 6 except that the mixture of $Li_{1.02}Mn_{1.98}O_4$ of 72.8 parts by weight and $LiNiO_2$ of 18.2 parts by weight was used as the positive active material.

Then, the following charging and discharging tests were carried out for the Samples 1 to 5 manufactured as mentioned above.

As for a charging test, a constant-current and constant-voltage charging test was carried out under the conditions of charging voltage of 4.20 V and charging current of 1 C. Further, as for a discharging test, charging and discharging cycles were repeatedly carried out under the conditions of discharging voltage of 3.0 V and discharging current of 0.5 C to measure the discharging capacity of 10th cycle and 300th cycle. Further, the discharging capacity maintaining/retention ratio (%) of the 300th cycle relative to the 10th cycle was obtained.

As for the Samples 1 to 5, the evaluation results of the charging and discharging cycles are shown in Table 1.

TABLE 1

| | Irreversible Capacity of Negative Relative to Charging Capacity of Cathode (%) | Capacity of 10th Cycle (mAh) | Capacity of 300th Cycle (mAh) | 300/10 Maintaining/retention Ratio (%) |
|---|---|---|---|---|
| Sample 1 | 50 | 543 | 532 | 98 |
| Sample 2 | 40 | 651 | 625 | 96 |
| Sample 3 | 30 | 760 | 699 | 92 |
| Sample 4 | 20 | 869 | 797 | 89 |
| Sample 5 | 10 | 1022 | 848 | 83 |

As apparent from the evaluation results shown in the Table 1, a value of X, that is, as the irreversible capacity of an negative relative to the charging capacity of a cathode increases, a maintaining/retention ratio increases and shows a very good value as high as 98% when the irreversible capacity of the negative relative to the charging capacity of the cathode is 50%.

It was understood from the above results that the battery was designed so that the irreversible capacity of the negative relative to the charging capacity of the cathode decreased, and accordingly, the use of a part of a positive active material located in a large depth of discharge as an area where the capacity was terribly reduced could be avoided, hence a capacity maintaining/retention ratio could be improved in the repeated charging and discharging test.

Further, as for the Samples 6 to 11, a battery capacity after charging and discharging operations were carried out ten times, that is, after the 10th cycle and a battery capacity after the 300th cycle were measured. Further, in these Samples, the battery capacity after the 10th cycle under the atmosphere of 45° C. and the battery capacity after 100th cycle under the atmosphere of 45° C. were measured. Charging conditions were set in such a manner that a charging operation was carried out up to 4.2 V under constant-current of 1000 mAh (1 C), and then, a charging operation was carried out for 3 hours under constant-voltage of 4.2 V. Discharging conditions were in such a manner that a discharging operation was carried out up to 3.0 V under the current of 500 mAh (0.5 C).

The evaluation results of the battery capacity after the 10th cycle, the battery capacity after the 300th cycle, a battery capacity maintaining/retention ratio after a 300th cycle, a battery capacity after a 10th cycle under the atmosphere of 45° C., a battery capacity after a 100th cycle under the atmosphere of 45° C. and a battery capacity maintaining/retention ratio after 100th cycle under the atmosphere of 45° C. in Samples 6 to 11 are respectively shown in Table 2.

TABLE 2

|  | Cathode Active Material | Elution Amount of Mn (%) | Battery Capacity after 10th Cycle (mAh) | Battery Capacity after 300th Cycle (mAh) | Battery Capacity Maintaining/ retention Ratio after 300th Cycle (%) | Battery Capacity 10th Cycle at 45° C. (mAh) | Battery Capacity 100th Cycle at 45° C. (mAh) | Battery Capacity Maintaining/ retention Ratio after 100th Cycle at 45° C. (%) |
|---|---|---|---|---|---|---|---|---|
| Sample 6 | $LiCr_{0.2}Mn_{1.8}O_4$ | 0.03 | 1115 | 1037 | 93 | 1118 | 917 | 82 |
| Sample 7 | $LiCr_{0.15}Mn_{1.85}O_4$ | 0.035 | 1183 | 1088 | 92 | 1176 | 953 | 81 |
| Sample 8 | $LiCr_{0.2}Mn_{1.8}O_4 + LiNiO_2$ | 0.03 | 1303 | 1225 | 94 | 1307 | 1098 | 84 |
| Sample 9 | $Li_{1.05}Mn_{1.95}O_4$ | 0.05 | 1205 | 964 | 90 | 1202 | 841 | 70 |
| Sample 10 | $Li_{1.02}Mn_{1.98}O_4$ | 0.08 | 1284 | 809 | 63 | 1280 | 614 | 48 |
| Sample 11 | $Li_{1.02}Mn_{1.98}O_4 + LiNiO_2$ | 0.08 | 1368 | 1040 | 76 | 1371 | 823 | 60 |

In the Table 2, the battery capacity maintaining/retention ratio after 300th cycle indicates a battery capacity ratio after the 300th cycle relative to a battery capacity after a 10th cycle. Further, the battery capacity maintaining/retention ratio after the 100th cycle under the atmosphere of 45° C. indicates a battery capacity ratio after the 100th cycle under the atmosphere of 45° C. relative to the battery capacity after the 10th cycle under the atmosphere of 45° C.

As apparent from the evaluation results shown in the Table 2, in the Samples 6 to 8 using the positive active material having a small elution amount of Mn, the battery capacity maintaining/retention ratio after the 300th cycle and the battery capacity maintaining/retention ratio after the 100th cycle under the atmosphere of 45° C. are higher than those of the Samples 9 to 11 using the positive active material having a large elution amount of Mn and the deterioration of the battery capacity due to the charging and discharging operations is suppressed.

In the Samples 9 to 11, since a part of Mn of the spinel type lithium manganese oxide is not replaced by a transition metal and a positive active material in which an elution amount of Mn measured by a measuring method for an elution amount of Mn is relatively large is employed, the positive active material is deteriorated and Mn is eluted on an negative to form a coat including Mn thereon when the battery is stored at high temperature or charged and discharged. Accordingly, in the Samples 9 to 11, it is guessed that the coat on the negative prevents the doping and dedoping actions of lithium ions so that the battery characteristics such as a battery capacity or charging and discharging characteristics, etc. may be possibly deteriorated.

On the other hand, in the Samples 6 to 8, since the spinel type lithium manganese oxide in which a part of Mn is replaced by Cr is used as the positive active material, the stability of the positive active material is excellent. Accordingly, even when the battery is stored at high temperature and charged and discharged, Mn is prevented from being eluted to be deposited on the negative and form a coat due to the deterioration of the positive active material. Accordingly, the deterioration of the battery characteristics such as a battery capacity or charging and discharging characteristics, etc. can be suppressed without preventing the doping and dedoping actions of lithium ions on the negative in the Samples 6 to 8.

As understood from the above description, when the spinel type lithium manganese oxide is used for the positive active material of the battery, the spinel type lithium manganese oxide in which a part of Mn is replaced by the transition metal composed of Cr is extremely effectively employed in manufacturing the nonaqueous electrolyte battery.

INDUSTRIAL APPLICABILITY

According to the present invention as described above, in the nonaqueous secondary battery using the spinel type lithium manganese oxide for the positive active material, the balance between the cathode and the negative is adjusted so that the rate X of irreversible capacity of the negative relative to the charging capacity of the cathode is located within a range of 50% to 20%, so that a frequency of use of a part of the spinel type lithium manganese oxide in which the capacity is severely deteriorated is decreased. Thus, according to the present invention, the nonaqueous electrolyte battery having good cyclic characteristics can be realized.

Further, according to the present invention as described above, since a part of manganese (Mn) of the spinel type lithium manganese oxide is replaced by the transition metal, the elution of manganese (Mn) from the cathode is suppressed when the positive active material is employed in the nonaqueous electrolyte battery. Therefore, there can be provided a positive active material excellent in its cathode performance and a method for producing it and a nonaqueous electrolyte battery in which battery characteristics are greatly improved and a method for manufacturing it.

The invention claimed is:

1. A nonaqueous electrolyte battery comprising:
   (a) a cathode comprising a positive active material, said positive active material comprising a spinel type lithium manganese oxide of formula $LiMn_2O_4$ or $LiMn_{2-x-y}M_yO_4$ wherein:
   (i) $x \geq 0.9$;
   (ii) $0.01 \leq y \leq 0.5$, and
   (iii) M is one or more elements selected from the group consisting of Fe, Co, Ni, Cu, Zn, Al, Sn, Cr, V, Ti, Mg, Ca and Sr;
   (b) an anode including a negative active material capable of being doped with or dedoped of lithium; and
   (c) a nonaqueous electrolyte provided between the cathode and the anode, wherein:
a ratio X $$\frac{(Ac - Ad) \times Aw}{Cc \times Cw} \times 100 = X \qquad \text{FORMULA 1}$$

is such that 20≦X≦50, with the first charging capacity of the positive active material per gram being Cc [mAh/g], the weight of the positive active material being Cw [g], the first charging capacity of the negative active material per gram being Ac [mAh/g], the first discharging capacity being Ad [mAh/g] and the weight of the negative active material being Aw [g].

2. The nonaqueous electrolyte battery according to claim 1, wherein said cathode and said anode are elongated electrodes laminated through a separator and spirally coiled a plurality of times to form a spirally coiled body.

3. The nonaqueous electrolyte battery according to claim 1, wherein said negative active material is a carbonaceous material or an alloy material.

4. A method for manufacturing a nonaqueous electrolyte battery comprising a cathode including a positive active material having a spinel type lithium manganese oxide; an anode including a negative active material capable of being doped with or dedoped from lithium; and a nonaqueous electrolyte provided between the cathode and the anode, wherein assuming that the first charging capacity of the positive active material per gram is Cc [mAh/g], the weight of the positive active material is Cw [g], the first charging capacity of the negative active material per gram is Ac [mAh/g], the first discharging capacity is Ad [mAh/g] and the weight of the negative active material is Aw [g], the amount of the positive active material and the amount of the negative active material are adjusted so that the value of X [%] expressed by a FORMULA 2 satisfies a range expressed by 20≦X≦50.

$$\frac{(Ac - Ad) \times Aw}{Cc \times Cw} \times 100 = X. \qquad \text{FORMULA 2}$$

5. The method for manufacturing a nonaqueous electrolyte battery according to claim 4, wherein as the spinel type lithium manganese oxide, is used a compound represented by a general formula $LiMn_2O_4$ or $LiMn_{2-x-y}M_yO_4$ (in the formula, x≧0.9 and y is located within a range expressed by 0.01≦y≦0.5. M indicates one or more kinds of elements selected between Fe, Co, Ni, Cu, Zn, Al, Sn, Cr, V, Ti, Mg, Ca and Sr).

* * * * *